United States Patent Office 3,330,834
Patented July 11, 1967

3,330,834
NAPHTHALIMIDE WHITENING AGENTS AND
METHOD OF MAKING SAME
Hisashi Senshu, Kitakyushu-shi, Fukuoka-ken, and Masao
Yamashita, Yahata-ku, Kitakyushu-shi, Fukuoka-ken,
Japan, assignors to Mitsubishi Chemical Industries Limited, Tokyo, Japan, a corporation of Japan
No Drawing. Filed Oct. 25, 1963, Ser. No. 318,828
12 Claims. (Cl. 260—281)

The present invention relates to new optical whitening agents, particularly to new optical whitening agents comprising novel naphthalimide derivatives, and a method for the manufacture as well as the applications of said optical whitening agents. An object of the present invention is to provide useful novel optical whitening agents. Another object of the invention is to provide a method for economically manufacturing the novel optical whitening agents. Further object of the invention is to provide a method for imparting a remarkable white-enhancing effect to artificial or synthetic organic high molecular weight materials such as textile or plastic materials.

The abovementioned first object of the invention is accomplished by providing new naphthalimide derivatives shown by the following Formula 1:

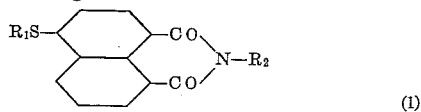

(1)

wherein $R_1$ denotes an organic group having no dyestuff character and $R_2$ denotes hydrogen atom or an organic group having no dyestuff character.

As a result of our extensive studies made for the purpose of obtaining valuable, novel optical whitening agents for various artificial or synthetic organic high molecular weight materials such as textile or plastic materials, we have found such naphthalimide derivatives as shown by Formula 1 entirely satisfactory for achieving our aforementioned objects. Namely, these compounds when dissolved or dispersed in a suitable solvent or when applied to a fitting fundamental material emit a distinctive greenish blue fluorescence in daylight or ultraviolet rays showing a wide absorption in the ultraviolet range. Further, these compounds generally have good stability and exhibit strong affinity with artificial or synthetic organic high molecular weight materials. Hence, the compounds of Formula 1 are able to impart an outstanding and durable optical whitening effect to the abovementioned materials.

Among the optical whitening agents shown by the above Formula 1 there are cited various naphthalimide derivatives. For example, $R_1$ in the Formula 1 includes an organic group having no dyestuff character which may be, for example, such alkyl groups of straight chain or branched chain as methyl, ethyl, n- or iso-propyl, n- or iso-butyl, n- or iso-pentyl, n- or iso-hexyl, n-octyl, 2-ethyl-hexyl, n- or iso-dodecyl, and n- or iso-tridecyl. Further, $R_1$ may be a substituted alkyl group substituted by at least one of hydroxy, alkoxy, aryl, primary amino, secondary amino such as alkyl amino, tertiary amino such as bisalkyl amino and quaternary ammonium such as trialkyl ammonium. They may be, for example, hydroxyethyl, hydroxypropyl, hydroxybutyl, methoxyethyl, ethoxyethyl, ethoxypropyl, propoxypropyl, benzyl, aminoethyl, aminopropyl, N,N-dimethyl-amino-ethyl, N,N-dimethyl-amino-propyl, N-trimethyl ammonium ethyl, N-trimethyl ammonium propyl, N-triethyl ammomium ethyl, and N-triethyl ammonium propyl. Still further, $R_1$ may be such aryl group as phenyl and naphthyl or a substituted aryl group substituted by at least one of alkyl, alkoxy, hydroxy, alkoxyalkyl, hydroxyalkyl, amino, secondary aminoalkyl, tertiaryaminoalkyl, quaternary-ammonium alkyl, nitro, and halogen. Still further, $R_1$ may be such cycloaliphatic group as cyclohexyl. Also, $R_1$ may be, for example, such a group as shown by the formula:

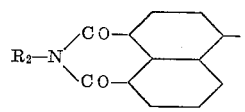

On the other hand, $R_2$ shown in the Formula 1 denotes either hydrogen atom or an organic group having no dyestuff character. The said organic group may be any of various groups having no dyestuff character that have been referred to as $R_1$ in the foregoing.

The embodiments of the optical whitening agents according to the present invention will be further illustrated by reference to the examples given below.

The optical whitening agents according to the invention are economically manufactured by the methods as follows:

The most practical method for manufacturing the optical whitening agents of the invention comprises etherifying 4-mercapto-naphthalimide or its derivative, which is indicated by the following formula:

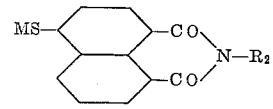

wherein M denotes hydrogen atom or alkali metal, and $R_2$ is of the same significance as in Formula 1, by the use of an etherifying agent having no dyestuff character.

Among 4-mercapto-naphthalimides indicated by the aforementioned formula, there are 4-mercapto-naphthalimides or alkali salts thereof, e.g., sodium salts and potassium salts and their N-substituted compounds. The said N-substituted compounds have an organic group having no dyestuff character as the N-substituents which have been explained as $R_2$ in Formula 1. As regards the etherifying agents to be used for etherifying the 4-mercapto-naphthalimides, strong acid esters having no dyestuff character may first be mentioned. The representative examples of said strong acid esters are such alkyl sulphate as dimethyl sulphate or diethyl sulphate. As the etherifying agents may also be cited organic compounds containing an active halogen atom, which may be for example such alkyl halides as methyl iodide, ethyl iodide, methyl bromide, ethyl bromide, butyl bromide, methyl chloride, and ethyl chloride or such substituted alkyl halides as ethylene chlorohydrin, and 1 - N,N - dimethylamino-2-chloro-ethane, benzyl chloride or such halogenated aryl derivatives as p-nitrochlorobenzene and 4-chloro-N-methyl-naphthalimide. Also, such esters of organic sulphonic acid as methyl ester of p-toluene sulphonic acid or ethyl ester of p-toluene sulphonic acid may be employed as the etherification agent. The etherification reaction may be efficiently performed in the presence of such alkaline substances preferably as alkali metal hydroxides, alkali metal carbonates, alkali metal bicarbontes, alkali metal phosphates, alkali metal silicates and alkali metal acetates. The etherification reaction is effected generally at temperature in a range from about 20 to 200° C. while using preferably such inert diluents as water or alcohols. In accordance with such a method the desired product as indicated by Formula 1 is produced. Generally, the reaction product is allowed to precipitate at room temperature and subject to subsequent filtration for separation. Alternatively, the reaction liquor is either acidified or concentrated by way of distilling the diluent off the reaction liquor so that the reaction product is precipitated and it is then separated by filtration. The purity of the reaction product thus obtained is generally high enough but the purity may be enhanced, if required, either by washing of said reaction product employing an alkaline aqueous solution or by recrystallization of said reaction product employing a solvent.

The 4-mercapto-naphthalimides employed as the starting materials in the abovementioned methods may be manufactured in a more advantageous manner from economical point of view by a method in which 4-halogeno-naphthalimides as indicated by the following formula:

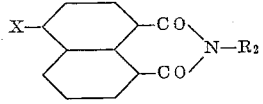

wherein X denotes a halogen atom, and $R_2$ is of the same significance as in the aforementioned Formula 1, is caused to react with alkali metal sulphides as indicated by $M_2S_y$, M denoting an alkali metal and $y$ a number from 1 to 5, in the presence of such an inert solvent as water or an alcohol or a mixture thereof at a temperature from 30 to 100° C.

The aforementioned 4-halogeno-naphthalimides may be manufactured in an economical manner in accordance with any of two processes as shown by formulae which follow:

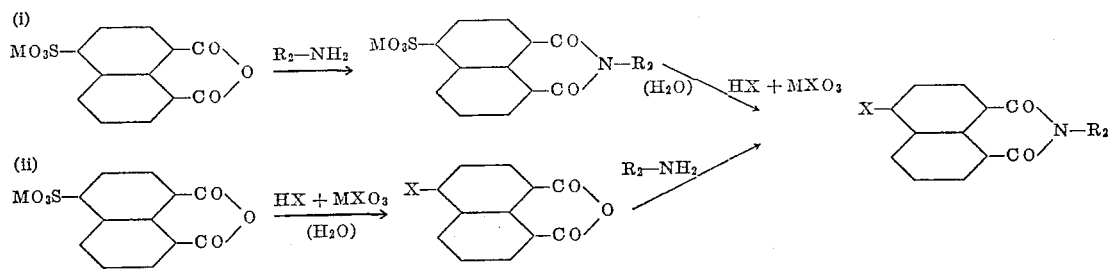

wherein M denotes hydrogen atom or an alkali metal and X a halogen atom.

Further, the optical whitening agents as shown by Formula 1 may be manufactured in accordance with a process in which a compound as indicated by formula:

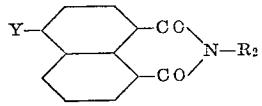

wherein Y denotes a sulpho group, a salt thereof, nitro group or halogen atom, and $R_2$ is of the same significance as in Formula 1 is condensed with a mercaptan as indicated by $R_1SH$, $R_1$ being of the same significance as $R_1$ in the aforementioned Formula 1.

Still further, the optical whitening agents as indicated by the aforementioned Formula 1 may be manufactured by condensing a compound as indicated by a formula which follows:

wherein $R_1$ is of the same significance as in the aforementioned Formula 1 or an ahydride thereof with a compound as indicated by formula $R_2$—$NH_2$, $R_2$ being of the same significance as $R_2$ in the aforementioned Formula 1.

The novel optical whitening agents as indicated by Formula 1 exert remarkable whitening effect on various materials, particularly on artificial or synthetic organic high molecular weight materials by fixing, penetrating, mingling, or adhering.

The treatment of such polyester textile material as polyethylene terephthalate is generally performed in accordance with conventional methods for dyeing this textile material by using an aqueous dispersing medium containing the optical whitening agent of the invention. For this purpose, a treating bath is made up by way of uniformly dispersing the optical whitening agents in water by use of a suitable dispersing agent and or wetting agent, said bath being used for dipping or padding polyester textile material at a temperature up to 100° C. In some cases, so-called carrier dyeing method may be carried out wherein such "carrier" as chlorobenzene series is employed. Also so-called high temperature dyeing or thermosol process to be employed for dyeing polyester textile material is applicable as the method of treatment according to the invention. Polyester textile material thus treated emits greenish blue fluorescence in daylight or ultraviolet rays. Hence, a remarkable whitening effect is imparted while neutralizing the yellowish tint of textile material. The optical whitening agents may be efficiently applied to various types of synthetic or artificial textile materials including such polyvinyl textile materials as polyacrylonitrile and polyvinyl chloride; such nitrogen-containing textile materials as polyamide; such polyolefin textile materials as polypropylene; and such cellulose esters as cellulose acetate. The optical whitening agents according to the invention are also applicable to whiten such moulded materials as film, sheet, plate, board, tube, pipe, and block, etc. which are made of various synthetic or artificial resins. For example, mixing the optical whitening agent according to the invention with such synthetic resin as polystyrene or polymethyl methacrylate followed by such moulding as extrusion and injection results in producing a transparent moulded material, which emits greenish blue fluorescence. A brilliant coloured material may be obtained by blending a suitable colouring agent in the abovementioned mixing. The optical whitening agents are also applied to white-enhancing treatment of various moulded materials composed of synthetic resins such as polyvinyl chloride, polyacrylate, polyester, polycarbonate, polyurethane, polyamide, and polyolefin. As a result of these treatments an excellent white-enhancing effect is always bestowed although the degree is not exactly the same. The optical whitening agents in accordance with the present invention may be employed in a mixture with such an optical whitening agent that is indicated by a formula which follows:

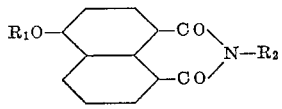

wherein $R_1$ and $R_2$ each are of the same significance as in the aforementioned Formula 1. Such a mixture gives an optical whitening effect which emits fluorescence having more bluish tint.

The white-enhancing treatments by use of the optical whitening agents according to the invention may be carried out by methods other than the abovementioned methods. For example, mixing of the optical whitening agents according to the invention may be carried out in a suitable step during the process of manufacturing textile material or synthetic resin. Further, it may be feasible to spread on the surfaces of moulding material a suitable solvent in which the optical whitening agents are contained.

Some preferred embodiments of the invention will be described in detail wherein the examples given are for

Example 1

24.6 parts of N-methyl-4-chloro-naphthalimide are added to a solution consisting of 15.6 parts of sodium sulphide ($Na_2S$), 100 parts of water and 200 parts of methanol, and heated under stirring to effect reaction for 4 hours at the boiling point. Upon completion of the reaction the reaction liquor is cooled to about 50° C., and to which added is a solution composed of 20.8 parts of sodium bisulphite and 40 parts of water, followed by filtration to remove precipitate. The filtrate contains 25.2 parts of sodium salt of N-methyl-4-mercapto-naphthalimide. The filtrate is acidified by adding thereto a quantity of dil. HCl, filtered to take out precipitate, rinsed with cool water until the precipitate becomes neutral, and dried under reduced pressure. Thus obtained are 19.5 parts of N-methyl-4-mercapto-naphthalimide of melting point from 214.5 to 216.2° C. The analytical values of this product closely approximate the calculated values as indicated below:

Calcd. for $C_{13}H_9NO_2S$: C (percent), 64.18; H (percent), 3.73; N (percent), 5.77; S (percent), 13.17. Found: C (percent), 60.94; H (percent), 3.37; N (percent), 6.20; S (percent), 13.28.

N-methyl-4-bromo-naphthalimide may be employed as the starting material in place of N-methyl-4-chloro-naphthalimide to obtain the same product as in this example. Also, the same product may be obtained by use of such sodium polysulphides as $Na_2S_2$, $Na_2S_3$, $Na_2S_4$ or $Na_2S_5$ in place of sodium sulphide ($Na_2S$) employed in this example.

Example 2

24.6 parts of N-methyl-4-chloro-naphthalimide are added to a solution containing 18.8 parts of a mixture of sodium sulphide ($Na_2S$) and sodium disulphide ($Na_2S_2$) in 300 parts of water and heated under stirring to effect reaction for ten hours at a temperature from 95 to 98° C. Upon completion of the reaction, the resultant product is subject to the same treatment as in Example 1 to obtain 19.0 parts of N-methyl-4-mercapto-naphthalimide.

Example 3

28.8 parts of N-n-butyl-4-chloro-naphthalimide are added to a solution comprising 22.0 parts of sodium disulphide, 110 cc. of water and 200 parts of ethanol and heated under stirring to effect reaction for 4 hours at the boiling point. Upon completion of the reaction, 250 parts of water are added to the reaction mixture to which further added is an aqueous solution comprising 20.8 parts of sodium bisulphite and 40 parts of water, and filtered to remove precipitate. The filtrate contains 20.0 parts of sodium salt of N-n-butyl-4-mercaptonaphthalimide. The filtrate is subject to the same treatment as in Example 1 to obtain 14.3 parts of N-n-butyl-4-mercapto-naphthalimide of melting point from 116.5 to 118.0° C. The same product is obtained by employment of N-n-butyl-4-bromo-naphthalimide in place of N-n-butyl-4-chloro-naphthalimide employed in this example. The analytical values of this product closely approximate the calculated values as indicated below:

Calcd. for $C_{16}H_{15}NO_2S$: C (percent), 67.34; H (percent), 5.27; N (percent), 4.91; S (percent), 11.22. Found: C (percent), 66.60; H (percent), 5.25; N (percent), 4.88; S (percent), 11.27.

Example 4

12.0 parts of sodium hydroxide and 26.5 parts of a sodium salt of N-methyl-4-mercapto-naphthalimide manufactured in accordance with the method of Example 1 or 2 are dissolved in 500 parts of water. To the resulting solution are added 25.2 parts of dimethyl sulphate and stirred for 10 hours at a temperature from 20 to 30° C. Upon completion of the reaction, the reaction mixture is filtered to remove the precipitate. The filtered cake is rinsed in succession by sodium carbonate aqueous solution and water until the cake becomes neutral, and dried to obtain N-methyl-4-methylthio-naphthalimide with theoretical yield. Recrystallization of this product by use of acetic acid results in obtaining a pure product of melting point from 219.5 to 220.0° C. The analytical values of this product closely approximate the calculated values as shown below:

Calcd. for $C_{14}H_{11}NO_2S$: C (percent), 65.3; H (percent), 4.29; N (percent), 5.45; S (percent), 12.45. Found: C (percent), 63.98; H (percent), 4.21; N (percent), 5.30; S (percent), 12.10.

The same product as mentioned above is obtained by use of either 15.9 parts of sodium carbonate or 20.7 parts of potassium carbonate in place of 12.0 parts of sodium hydroxide employed in this example.

This product emits distinct fluorescence of greenish blue tint in such organic solvents as methanol or acetic acid. Further, this product gives an excellent optical white-enhancing effect to organic high molecular weight materials.

Example 5

12.0 parts of sodium hydroxide are dissolved in a solution consisting of 26.5 parts of sodium salt of N-methyl-4-mercapto-naphthalimide manufactured by the method in Example 1 or 2 and 500 parts of water, 37.2 parts of methyl ester of p-toluene sulphonic acid are added thereto, and stirred for 2 hours at a temperature from 20 to 30° C. to effect subsequent reaction for 2 hours at 80° C. Upon completion of reaction, the reaction product is cooled and filtered to remove the precipitate, which is washed by water and dried to obtain with theoretical yield N-methyl-4-methylthio-naphthalimide of the same grade as in Example 4.

Example 6

12.0 parts of sodium hydroxide are dissolved in an aqueous solution comprising 26.5 parts of sodium salt of N-methyl-4-mercapto-naphthalimide manufactured by the method in Example 1 or 2 to which 41.2 parts of n-butyl iodide are added and heated to cause reaction for 2 hours at 85° C. Upon completion of the reaction, the reaction product is cooled and filtered to remove the precipitate. The filtered cake is rinsed in succession with methanol and water, and dried to obtain with theoretical yield N-methyl-4-n-butylthio-naphthalimide. The recrystallization of this product by use of acetic acid results in obtaining a pure product of melting point from 101.0 to 102.5° C. This material emits a distinctive fluorescence of greenish blue in methanol or acetic acid, and imparts an excellent optical white-enhancing effect to organic high molecular weight materials.

Example 7

30.7 parts of sodium salt of N-n-butyl-4-mercapto-naphthalimide manufactured by the method in Example 3 and 12.0 parts of sodium hydroxide are dissolved in 500 parts of water to which 25.2 parts of dimethyl sulphate are added, and stirred for 10 hours at a temperature from 30 to 40° C. Upon completion of the reaction, the reaction mixture is subject to the same treatment as in Example 4 to obtain with theoretical yield N-n-butyl-4-methylthio-naphthalimide of melting point above 330° C. This material emits a remarkable fluorescence in methanol or acetic acid, and imparts an excellent optical white-enhancing effect to various kinds of organic materials.

Example 8

To a solution comprising 400 parts of water and 100 parts of methanol are added 29.5 parts of sodium salt of N-(2'-hydroxy)ethyl-4-mercapto-naphthalimide, which is obtained by reacting N-(2'-hydroxy)ethyl-4-chloro-naphthalimide with sodium sulphide in accordance with the method in Example 2, and further 12.0 parts of sodium hydroxide. 50.4 parts of dimethyl sulphate are added to the resultant solution, stirred for 5 hours at a temperature from 20 to 30° C., and caused to react for 4 hours at 85° C. Upon completion of the reaction, the reaction mixture is subject to the same treatment as in Example 4 to obtain with theoretical yield N-(2'-hydroxy)ethyl-4-methylthio-naphthalimide of melting point from 176.8 to 177.2° C.

The analytical values of this product closely approximate the calculated values as shown below:

|  | C (percent) | H (percent) | N (percent) | S (percent) |
|---|---|---|---|---|
| Calcd. for $C_{15}H_{13}NO_3S$ | 62.75 | 4.53 | 4.88 | 11.15 |
| Found | 62.00 | 4.50 | 4.92 | 11.13 |

This material emits a remarkable fluorescence in organic solvent, and imparts an excellent optical white-enhancing effect to various kinds of organic materials.

Examples 9 to 11

An etherifying agent and a starting mercapto-naphthalimide compound listed respectively in columns A and B of the following table are caused to perform the reaction in accordance with the method as described in Example 4 to yield a novel optical whitening agent correspondingly listed in column C.

Example 17

1 part of N-methyl-4-methylthio-naphthalimide manufactured by the method in Example 4 is mixed with 2 parts of dispersing agent such as a condensate of naphthalene-2-sulphonic acid with formaldehyde. The mixture is pulverized into easily dispersible powder. The powder is dispersed in 30,000 parts of water to prepare a treatment bath. 150 parts of carrier (chlorobenzenes) are added to the bath in which 1,000 parts of polyester textile material are treated at a temperature from 98 to 100° C. for 2 hrs. The treated textile material is subjected to soaping in 10,000 parts of aqueous solution containing 30 parts of anion surface active agent at 90° C. for 15 mins. and then rinsed and dried. Thus the polyester textile material has been imparted a remarkable whitening effect with a good fastness. The same results as in this example were obtained in the case where the compounds obtained by the methods in Examples 6 to 16 were used.

Example 18

1 part of N-methyl-4-methylthio-naphthalimide is mixed with 2 parts of dispersing agent constituting a condensate, which consists of 2-naphthol-6-sulphonic acid, cresol and formaldehyde. The mixture is pulverized into easily dispersible powder. The powder is dispersed in 30,000 parts of water to prepare a treatment bath. In this bath are immersed 1,000 parts of polyester textile material to be subjected to a treatment at 120° C. for 1.5 hr.

|  | A | B | C |||
|---|---|---|---|---|
|  |  |  | Objective product | Melting point, °C. |
| Ex. 9 | Dimethyl sulphate | Sodium salt of 4-mercapto-naphthalimide. | 4-methylthio-naphthalimide | 285.2–288.8 |
| Ex. 10 | do | Sodium salt of N-(N'·N'-dimethylamino) propyl-4-mercapto-naphthalimide. | N-(N'·N'-dimethylamino) propyl-4-methylthio-naphthalimide. | 196.0–201.5 |
| Ex. 11 | do | Sodium salt of N-phenyl-4-mercapto-naphthalimide. | N-phenyl-4-methylthio-naphthalimide | 269.8–271.2 |

Note.—In Examples 10 and 11, the reaction continues for 10 hours initiating at a temperature from 20 to 30° C. followed by further reaction for 0.5 to 4 hours at a temperature from 85 to 95° C.

Examples 12 to 16

An etherifying agent and a starting mercapto-naphthalimide compound listed, respectively, in columns A and B are caused to react in accordance with the method described in Example 6 to yield a novel optical whitening agent listed correspondingly in column C in the following table:

The treated textile material is then subjected in sequence to soaping, rinsing, and drying as in Example 17. Thus remarkably whitened polyester textile material is obtained. Any of various compounds in Examples 6 to 16 may be used for performing the same treatment as in the present example to obtain similarly whitened polyester textile material as in this example.

|  | A | B | C ||
|---|---|---|---|---|
|  |  |  | Objective product | Melting point, °C. |
| Ex. 12 | Ethylene chlorohydrin | Sodium salt of N-methyl-4-mercapto-naphthalimide. | N-methyl-4-(2'-hydroxy) ethylthio-naphthalimide | 127.5–131.5 |
| Ex. 13 | N·N-dimethyl-ethyl-chloride. | do | N-methyl-4-(N'·N'-dimethyl) ethylthio-naphthalimide | 121.8–124.0 |
| Ex. 14 | Benzylchloride | do | N-methyl-4-benzylthio-naphthalimide | 178.8–179.5 |
| Ex. 15 | p-nitro-chlorobenzene | Sodium salt of N-methyl-4-mercapto-naphthalimide. | N-methyl-4-(4'-nitro) phenylthio-naphthalimide | 237.5–238.5 |
| Ex. 16 | N-methyl-4-chloro-naphthalimide | do | [structure: H₃C—N(OC-)(OC-)—⟨ring⟩—S—⟨ring⟩—(CO)(CO)N—CH₃] | 299.0–303.2 |

Note.—In Examples 15 and 16, the reaction continued for 8 hours at a temperature from 95 to 100° C.

Example 19

1 part of N-methyl-4-methylthio-naphthalimide is dispersed in 30,000 parts of water to prepare a treatment bath as in Example 18. In the bath are immersed 1,000 parts of cellulose acetate textile material and heated at 85° C. for 1 hr. Then, thus treated textile material is subjected to soaping at 50° C., rinsing and drying. Thus, to the treated textile material has been imparted a remarkable whitening effect.

1,000 parts of polyamide textile material or polyacrylonitrile textile material in place of cellulose acetate material may be subjected to the same treatment at 100° C. as in this example to impart to the respective textile material a remarkable whitening effect. Further, the whitening of these textile materials is effected also in the case where any of compounds in Examples 6 to 16 is used.

Example 20

A mixture of 1 part of N-methyl-4-methylthio-naphthalimide and 2 parts of dispersing agent employed in Example 18 is dispersed in 15,000 parts of water to prepare a treatment bath as in Example 18. In the bath are immersed 500 parts of polypropylene textile material followed by heating at 98 to 100° C. for 1.5 hr. and then soaping, rinsing, and drying. Thus a remarkable whitening is imparted to polypropylene textile material.

Example 21

A mixture of 0.01 part of N-methyl-4-methylthio-naphthalimide, 1 part of N-methyl-4-methoxy-naphthalimide and 2 parts of dispersing agent employed in Example 17 is dispersed in 30,000 parts of water. 150 parts of carrier (chlorobenzenes) are added to the bath in which 1,000 parts of polyester textile material are treated at a temperature from 98 to 100° C. for 2 hr. the treated material is then subjected in sequence to soaping, rinsing, and drying as in Example 17. Thus, to the polyester textile material has been imparted a remarkable whitening effect with a good fastness.

Example 22

A mixture of 2 parts of N-methyl-4-methylthio-naphthalimide and 10,000 parts of polystyrene resin pellet is kneaded at 190–200° C., and then moulded into a plate by using an injector. Thus a transparent plate is obtained which emits outstanding blue fluorescence. By adding 20 to 50 parts of titanium dioxide in the course of the aforementioned kneading a white-enhanced plate is obtained. Similar effect is brought about in the case where any compound in Examples 6 to 16 is used. Further, similar white-enhancing is also imparted to polymethyl methacrylate resin, polyvinylchloride resin, polyamide resin, polyester resin, and polycarbonate resin as used in place of polystyrene resin in this example.

What we claim is:

1. The compound

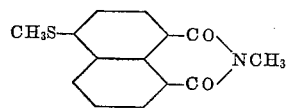

N-methyl-4-methylthio-naphthalimide

2. The compound

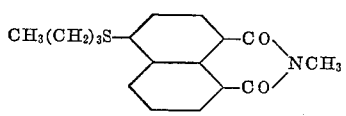

N-methyl-4-n-butylthio-naphthalimide

3. The compound

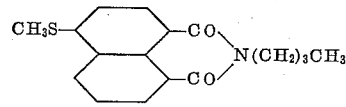

N-n-butyl-4-methylthio-naphthalimide

4. The compound

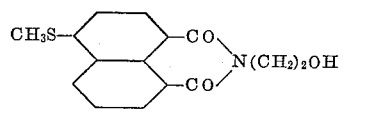

N-(2-hydroxyethyl)-4-methylthio-naphthalimide

5. The compound

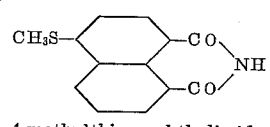

4-methylthio-naphthalimide

6. The compound

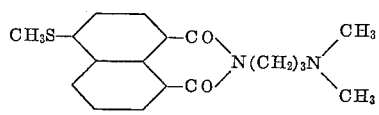

N-(N,N-dimethylaminopropyl)-4-methylthio-naphthalimide

7. The compound

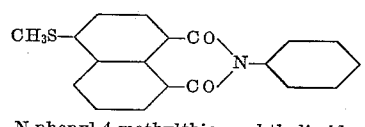

N-phenyl-4-methylthio-naphthalimide

8. The compound

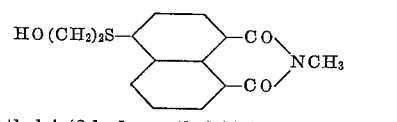

N-methyl-4-(2-hydroxyethylthio)-naphthalimide

9. The compound

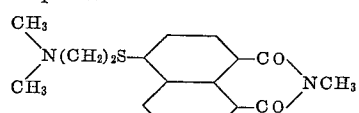

N-methyl-4-(N,N-dimethylaminoethylthio)-naphthalimide

10. The compound

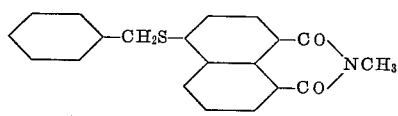

N-methyl-4-benzylthio-naphthalimide

11. The compound

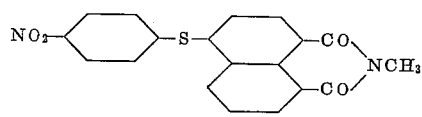

N-methyl-4-(4-nitrophenylthio)-naphthalimide

12. The compound

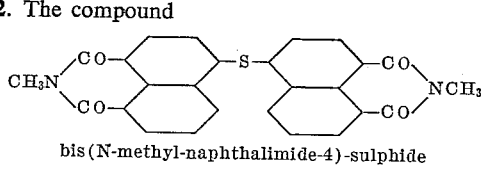

bis(N-methyl-naphthalimide-4)-sulphide (References on following page)

References Cited

UNITED STATES PATENTS

| | | | |
|---|---|---|---|
| 1,625,826 | 4/1926 | Schmidt | 260—281 |
| 2,231,495 | 2/1941 | Eckert et al. | 260—281 |
| 2,878,138 | 3/1959 | Rave et al. | 117—33.5 |
| 2,980,549 | 4/1961 | Craig | 117—33.5 |

FOREIGN PATENTS 517,630  8/1938  Great Britain.

OTHER REFERENCES

Fuson, "Organic Chemistry," Wiley, 1941, pages 62–3 relied upon.

ALEX MAZEL, *Primary Examiner.*

HENRY R. JILES, NICHOLAS S. RIZZO, *Examiners.*

DON M. KERR, D. G. DAUS, *Assistant Examiners.*